United States Patent [19]

Borg

[11] Patent Number: 4,998,711
[45] Date of Patent: Mar. 12, 1991

[54] WORKPIECE HOLDER AND METHOD OF INSTALLING A VEHICLE WINDSHIELD THEREWITH

[76] Inventor: Donald M. Borg, R.R. 1, Orton, Ontario, Canada, L0N 1N0

[21] Appl. No.: 484,174

[22] Filed: Feb. 23, 1990

[51] Int. Cl.⁵ .............................................. B25B 11/00
[52] U.S. Cl. ......................................... 269/21; 269/95
[58] Field of Search ....................... 269/21, 91, 93, 95, 269/17; 254/100, 231–236; 294/64.1; 248/206 R, 362, 363, 467, 167, 170, 436, 173

[56] References Cited

U.S. PATENT DOCUMENTS

| | | | |
|---|---|---|---|
| 310,767 | 1/1885 | Wilson | 254/235 |
| 649,045 | 5/1900 | Elliott | 254/236 |
| 3,910,621 | 10/1975 | Hillier | 294/64.1 |
| 4,183,511 | 1/1980 | Marek | 254/100 |
| 4,457,503 | 7/1984 | Connor | 269/21 |

FOREIGN PATENT DOCUMENTS 158389  4/1981  Fed. Rep. of Germany ........ 294/65

Primary Examiner—Robert C. Watson
Attorney, Agent, or Firm—K. Maxwell Hill

[57] ABSTRACT

The invention comprises a pair of suction cups held on each side of the inside of a windshield workpiece to be installed in vehicle body. The pair of suction cups are held together by an adjustable strap means whereby equal tension pull can be applied around the perimeter of the windshield as it is drawn down into the bonding agent around the opening of the vehicle body. A turnbuckle means is fastened intermediate the strap and is attached also to a point midway between the driver and passenger seats of the vehicle by means of the existing safety belts of the vehicle.

2 Claims, 2 Drawing Sheets

WORKPIECE HOLDER AND METHOD OF INSTALLING A VEHICLE WINDSHIELD THEREWITH

FIELD OF INVENTION

The present invention relates to a method and means for installing a windshield in a vehicle where the windshield is bonded to the metallic windshield opening in the vehicle body frame by glues whose purpose is to bond the glass of the windshield and the vehicle body to create an integral structure and contribute to the strength of the whole. It is a government requirement that when windshields are replaced in modern vehicles, that they be bonded to the frame with glues that require at least 24 hours to set. It is therefore a requirement that the replacement windshield be held fast in the setting position by a means and method that is secure and imobile.

OBJECTS OF THE INVENTION

It is the principal object of the invention to provide a method and means of pulling a replacement windshield into a perfect fitment into the body opening of a vehicle and of maintaining it there without shifting while the urethane gel glue sets in the bonding operation of the windshield with the vehicle body.

It is a collateral object of the invention to provide the means of fitting and pulling and holding the windshield in the vehicle body that is easy for a workman to use and which can be set up and dismanteled with alscrity and without damage to the tool or workpiece after many reuses.

It is a further object of the invention to use the seat belts of the vehicle to pull and hold down the fitment means used to maintain the windshield in immobile mode.

It is also an object of the invention to provide the fitment means with a fine adjustment that allows a workman to pull the windshield into embedment in the glue on the windshield opening of the vehicle body with a steady even force to assure that the whole perimeter edge becomes bonded fast.

SUMMARY OF THE INVENTION

The workpiece holder and method of installing a vehicle windshield therewith of the present invention comprises two pairs of suction cup each means each pair being attached to the inside of the windshield to be installed. One pair is attached to the mid part of one side half of the windshield and the other pair is attached to the mid part of the other side of the inside of the windshield. Each pair of suction cups is attached to and is spaced apart by rod member which lies parallel to the windshield when the pair of cups is attached to the windshield. The pairs of suction cups are attached one to the other by a buckleable strap member and a turnbuckle with a freely rotatable roller and yoke member adapted to receive the strap. When the strap member is buckled to attach the pairs of suction cups together with the turnbuckle freely hanging along the straps length a means of applying a downward pull on the whole perimeter of the windshield in the vehicle body opening is created.

On the end of the turnbuckle remote from the roller and yoke a clamping means is positioned and its purpose is to clamp together the two safety belts of the front seat of the vehicle thereby making means of attaching in tensioning mode the turnbuckle and its attached windshield and the rigid body of the vehicle frame. The straps or belts of the safety belts are each attached to their respective socket latches and then held together to allow their adjacent sides to overlie one another where the clamp is attached which point will be seen to be substantially in the point of the vehicle and the windshield where an equalizing force may be applied. With the bottom clamp is held fast to the pair of mating seat belts the upper roller end is run along the strap fixed to the two pair of suction cups until it rests at a mid way point when a fine adjustment threaded member can be used to draw the yoke and roller downward into the turnbuckle body and thereby subject the attached belts and straps to a steady force which allows a workman to draw the windshield into the urethane gel set in the periphery of the vehicle body with a controllable and even force.

IN THE DRAWINGS

With the foregoing in view, and such other objects advantages or novel features as may become apparent from consideration of this disclosure and specification, the present invention consists of the concept which is comprised embodied embraced and included in the method, construction arrangement and combination of parts or new use of any of the foregoing, herein exemplified in one or more specific embodiments of such concept, reference being had to the accompanying drawings in which like reference numerals refer to like parts.

THE PREFERRED EMBODIMENT OF THE INVENTION

Figure 1:
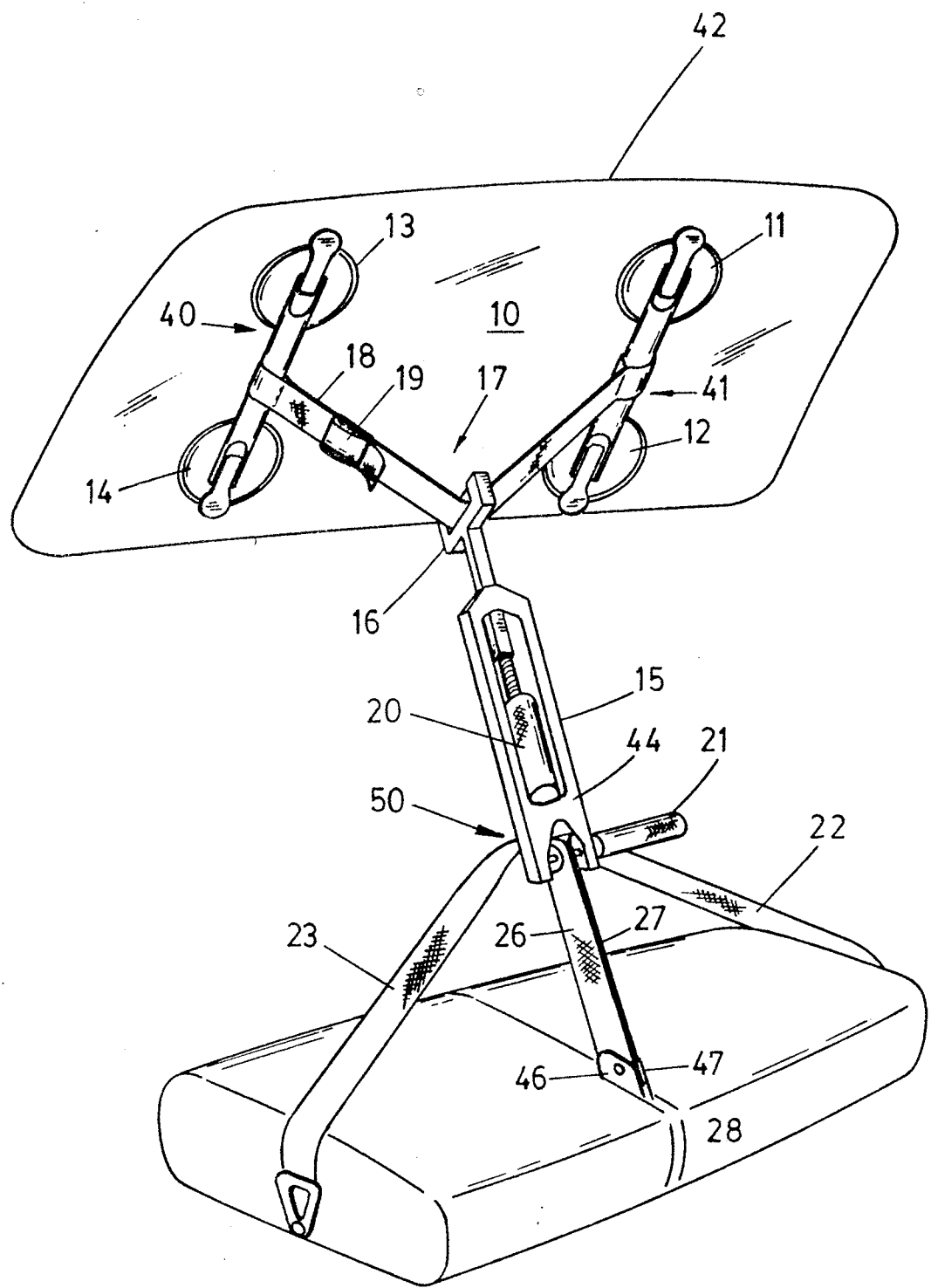
FIG. 1 is an elevation view of the inside of the front seat of a vehicle showing the pair of seats with their respective seat belts attached to the locking slots and the belts mating and overlying one another on their inner sides and the turnbuckle attached to them and to a strap which in turn is attached to the pairs of suction cups attached to a windshield.

In FIG. 1 the numeral 10 represents a workpiece, namely an automobile windshield in the process of being installed into the opening in a vehicle body (not shown) which has had the original windshield removed because of defect or damage or the like. A pair of suction cups 13, 14 attached together by spacer rod 40 are attached centrally of the inside of one side of the windshield 10 and a pair of suction cups 11, 12, attached together by spacer rod 41 are attached centrally of the inside of the windshield 10 tothe side of the windshield remote from pair 13, 14. A strap or belt 18 is attached between the mid point of each of spacer rods 40, 41, in double mode with a buckle means 19, for adjustment to allow the belt 18 to hang loosely between the pair of suction cup combinations as shown. A turnbuckle member 15 is shown attached to belt 18 at a point 17 where as shown by roller means of FIG. 3, it can roll freely along the belt 18 to a point equidistant between the suction cups where a uniform force can be applied. The perimeter edge 42 of the windshield 10 mates with lip of a vehicle body holding a rim of urethane gel glue into which the windshield workpiece is intended to be set. The turnbuckle 15 is used to adjust the force of downward pull of the device on the windshield to the required amount for setting of the windshield in the glue in the lip of the vehicle body opening after the windshield has been manually set in place by use of the spacer handles 40, 41, with the suction cups in place as shown.

A yoke shaped lower end of the turnbuckle 15 is enumerated 44 and comprises a pair of adjustable clamp means 35, 36, one of which has a fine adjustment knob 21 to allow for adjustment of the travel of screw 34 through threads in the yoke 44. (see FIG. 2)

A pair of the seat belts 22, 23, of the front seat 28 are done up by fitting them to their respective latches 47, 46, and adjusted to allow part 27 of belt 22 to overlie and mate with part of belt 23, namely portion 26. The bottom yoke end 44 of turnbuckle 15 has its clamp means fitted to the mating belts as to 50 thereby to attach the workpiece firmly to the vehicle body. A soft material 45 is fitted to the clamp heads 35, 36, to prevent the clamps from damaging the seat belts when force is applied to the clamps to hold the turnbuckle to them.

Figures 2, 3:
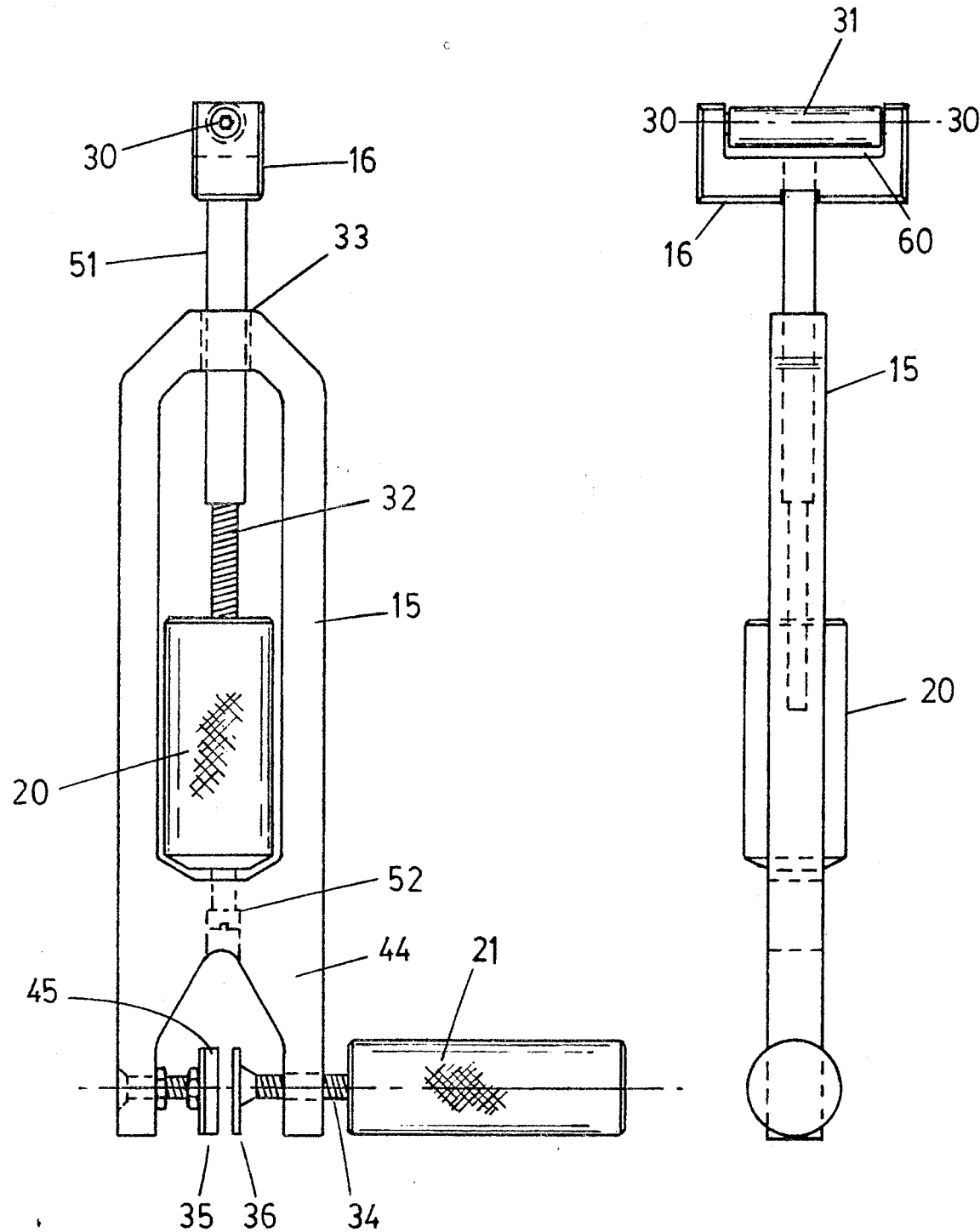
FIG. 2 is a front view of the turnbuckle of the invention showing the means for clamping the seat belts and the fine adjustment means for the strap roller holder.
FIG. 3 is a side view of the turnbuckle showing the roller in the yoke.

FIGS. 2 and 3 show the structure of the turnbuckle in detail. A roller member 31 is free to rotate in a bearing 30 in the yoke 16 fitted to the upper end of end of the turnbuckle 15 and the yoke 16 is attached to a shaft 51 which passes through opening 33 in the body 15 of the turnbuckle and a threaded portion 32 of the shaft 51 is threadably mounted to an adjustment screw 20 threadably mounted at 52 in the bottom of the turnbuckle 15.

OPERATION OF THE INVENTION

With the turnbuckle fitted by the bottom clamps 35, 36 to the vehicle seat belts 23, 22, as shown, the windshield 10 with the suction cups and strap belt 18 in place, the belt 18 is fitted to the roller 31 by first undoing buckle 19 and fitting the belt 18 through slot 60 thereby allowing the belt 18 to ride freely over the roller 31 which is rotatable on bearings 30, and then the buckle 19 done up to fasten the whole combination together to draw in the windshield into its bed of glue on the vehicle body opening lip. The adjustment screw 20 is threaded on thread 32 of rod 51 to provide the proper tension to hold the windshield in place rigid and immobile for the required 24 hours.

It will be apparent that where the device herein described is used in a particular shop where the same size and relative shape of workpiece windshields are installed the strap 18 and buckle 19 need only be adjusted once and the buckle and strap be fastened together as by sewing to thereby whole assembly; suction cups, strap and turnbuckle all one combination that can be stored together for instant use where required.

What I claim is:

1. In a means for holding a windshield workpiece in a vehicle body opening while said windshield workpiece is being set and fitted thereto, the combination of; a pair of suction cups adapted to be fitted each on the one half side of the inside surface face of a vehicle windshield;
   a looped strap means attached to each suction cup means, said strap hanging between the cups downwardly within the vehicle body;
   a turnbuckle member adjustably fitted to the mid point of said looped strap by a roller member on one end of said turnbuckle;
   a clamping member fitted to another end of said turnbuckle and adapted to hold together in mating relationship both the driver side safety belt and the passenger side safety belt thereby providing an easily fastenable and releaseable means for maintaining a windshield in a vehicle body window opening cavity while said windshield is being bonded to the peripheral edge of the window opening cavity.

2. A means of holding a windshield workpiece in a vehicle body opening as in claim 1 having a fine adjustment screw means on said turnbuckle and adapted to allow variable force pressure to be applied to the roller member holding the strap thereby permitting a firm but steady pressure to be applied to the suction cups fitted to the windshield.

* * * * *